No. 701,140.  
D. A. BRIGGS.  
HYDROCARBON OIL ENGINE.  
(Application filed Feb. 4, 1902.)
Patented May 27, 1902.
(No Model.)
2 Sheets—Sheet 1.
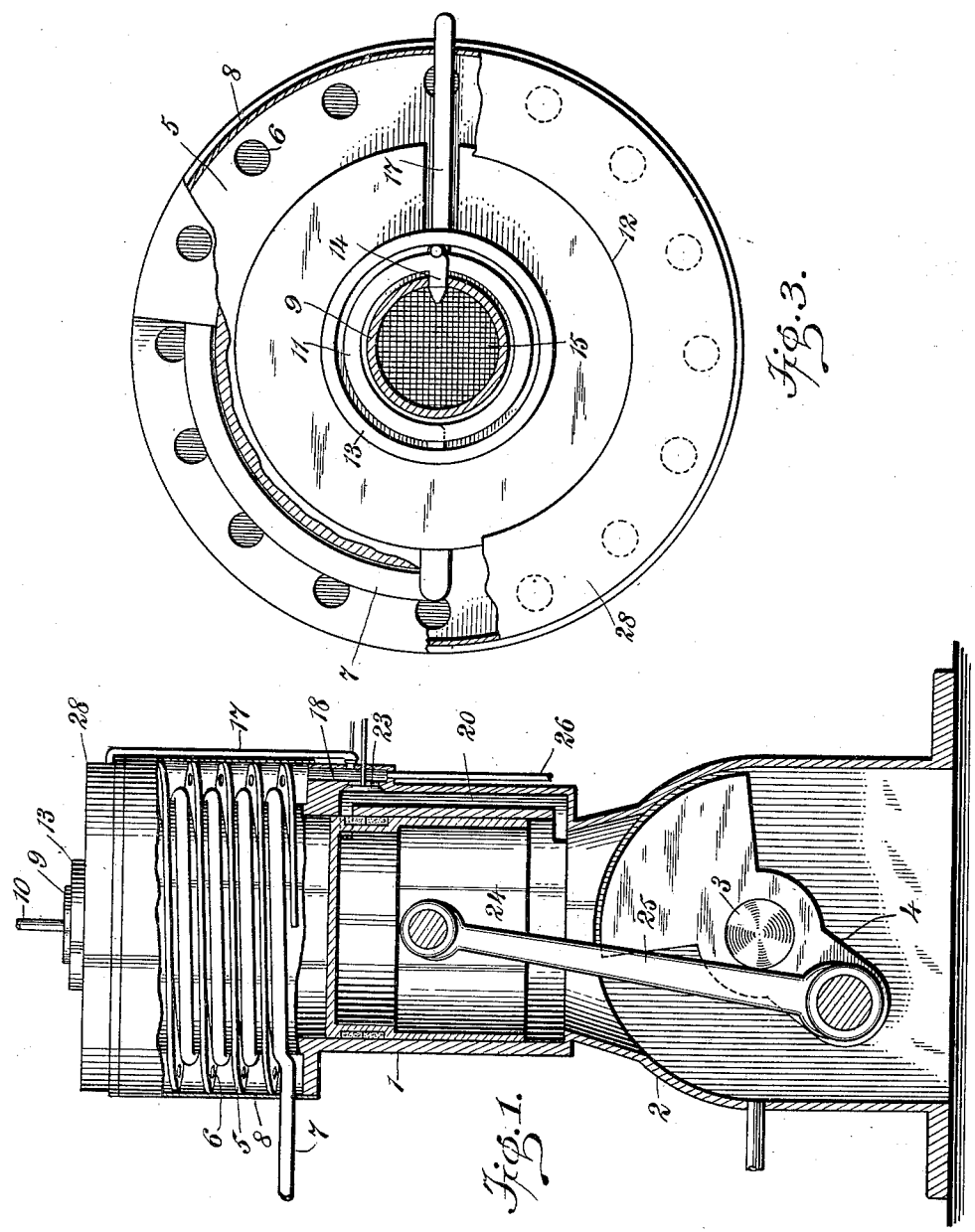
WITNESSES:
INVENTOR  
Dwight A. Briggs  
BY  
ATTORNEYS No. 701,140. Patented May 27, 1902.
D. A. BRIGGS.
HYDROCARBON OIL ENGINE.
(Application filed Feb. 4, 1902.)
(No Model.)
2 Sheets—Sheet 2.
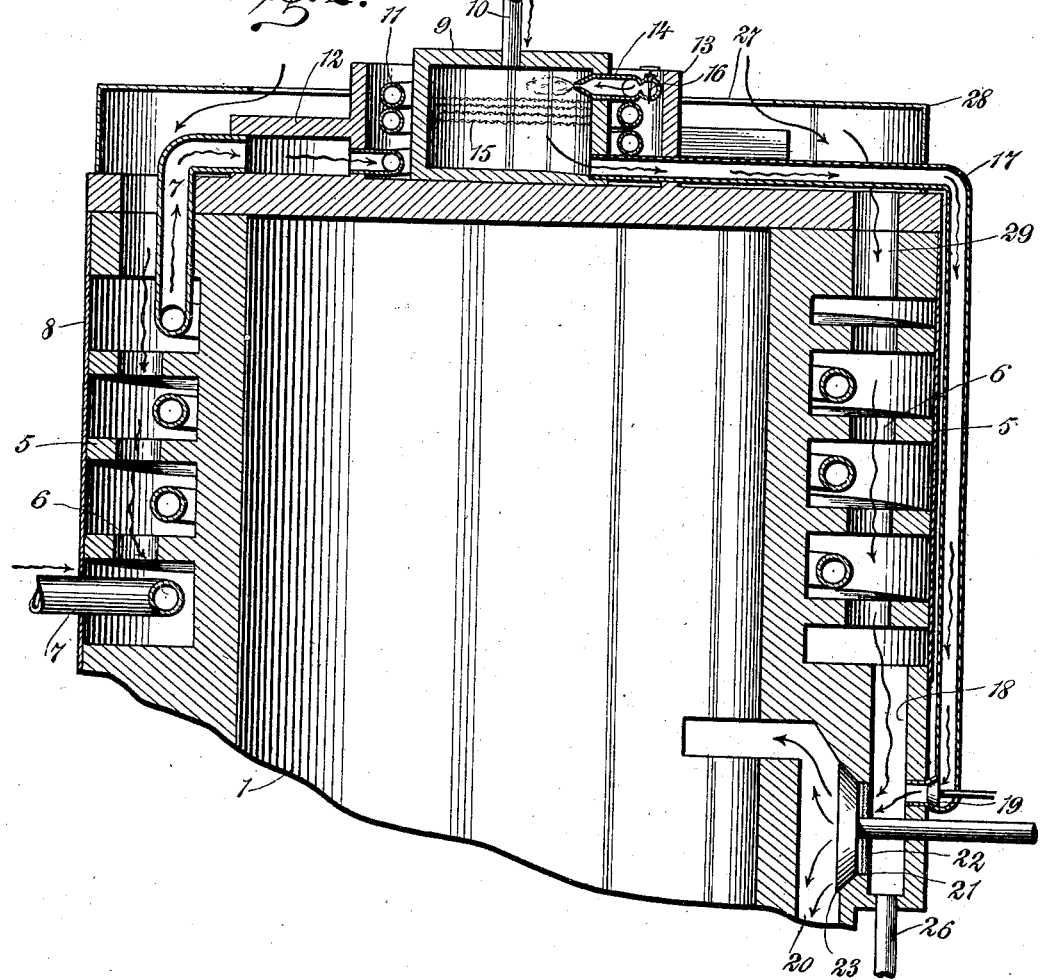
WITNESSES:
INVENTOR
Dwight A. Briggs
BY
ATTORNEYS

UNITED STATES PATENT OFFICE.

DWIGHT ALONZO BRIGGS, OF EVART, MICHIGAN.

HYDROCARBON-OIL ENGINE.

SPECIFICATION forming part of Letters Patent No. 701,140, dated May 27, 1902.

Application filed February 4, 1902. Serial No. 92,521. (No model.)

*To all whom it may concern:*

Be it known that I, DWIGHT ALONZO BRIGGS, a citizen of the United States, and a resident of Evart, in the county of Osceola and State of Michigan, have invented a new and Improved Hydrocarbon-Oil Engine, of which the following is a full, clear, and exact description.

This invention relates to improvements in hydrocarbon-engines, and the object is to provide an engine of this character of simple construction and in which the heat of the cylinder is utilized to vaporize the fuel and to heat the mixing air.

I will describe a hydrocarbon-oil engine embodying my invention and then point out the novel features in the appended claims.

Reference is to be had to the accompanying drawings, forming a part of this specification, in which similar characters of reference indicate corresponding parts in all the figures.

Figure 1 is a sectional view of a hydrocarbon-oil engine embodying my invention. Fig. 2 is a sectional elevation of the upper portion of the cylinder and the fuel-supply; and Fig. 3 is a plan view thereof, parts being broken away and in section.

Referring to the drawings, 1 designates the cylinder of the engine, supported on a suitable base 2, within which is journaled the power-shaft 3, having the crank 4. The upper portion of the cylinder 1 at its outer side is provided with a spirally-disposed rib 5, the several coils of which are provided with openings 6 for the passage of air. Also extended spirally around the cylinder and between the spirals of the rib 5 is an oil-feeding pipe 7, and this pipe and the rib are inclosed by a jacket 8. On the top of the cylinder is a vaporizing-chamber 9, having an air-inlet pipe 10 leading through its top, and surrounding this chamber 9 is a coiled pipe 11, which communicates at one end with an auxiliary heating-chamber 12, extending nearly the whole distance around the vaporizing-chamber, or rather around a cup 13, within which the vaporizing-chamber is arranged. The pipe 7 also communicates with said auxiliary heating-chamber 12. From the pipe 11 a spray-nozzle 14 extends into the vaporizing-chamber above a series of screens 15, arranged in the chamber. This nozzle 14 at its outer end is provided with an opening through which oil may pass into the cup 13 in starting the engine, as will be hereinafter described, and this opening is controlled by a needle-valve 16. A carbureted-air-conducting pipe 17 leads from below the screens 15 into a gas and air mixing chamber 18, and the communication between said pipe 17 and the chamber 18 is controlled by a valve 19. A port 20, formed in the wall of the cylinder, communicates with the chamber 18 through an opening 21, and in this opening is a screen material 22. The inlet of mixed air and gas to the port 20 is controlled by a valve 23. It will be seen in Fig. 1 that the port 20 communicates with the interior of the cylinder at its upper and lower ends, so that when the piston 24 is below the upper opening the fuel will pass into the cylinder above said piston. The piston 24 is connected to the crank 4 by means of the rod 25. Any oil that may pass into the chamber 18 will discharge therefrom through a pipe 26 into a closed tank, to be used again.

In operation the oil passing through the pipe 7 will become highly heated and will spray through the nozzle 14 into the vaporizing-chamber and mix with air entering through the pipe 10. It may be here stated, however, that for a preliminary heating to start the engine the needle-valve 16 is to be opened, permitting a portion of oil to pass into the cup 13, where it is to be ignited. When sufficient heat is thus generated, the valve is to be closed, and the engine or the heat therefrom will thus cause the proper generation of carbureted air. This carbureted air is finely divided as it passes through the sieve material 15, and thence passes down through the pipe 17 into the chamber 18, where it is met by atmospheric air, which passes down through an opening 27 in the top of the casing 28 on the cylinder, and thence through openings 29 in the wall of the cylinder and through the openings 6 of the rib 5. This atmospheric air before it reaches the chamber 18 will become highly heated; but in its passage it will prevent the pipe 7 from becoming too highly heated. When the valve 23 opens, this mixed gas and air will pass into the cylinder to operate the piston.

A suitable igniter will be placed in the cylinder near the top, and the exploded charge may exhaust through a port leading from the cylinder opposite and slightly above the inlet-port. The valve 19 may be operated manually, but the valve 23 will be operated by the engine in the usual manner.

Having thus described my invention, I claim as new and desire to secure by Letters Patent—

1. In a hydrocarbon-oil engine, a cylinder, a rib extended spirally around said cylinder and having openings through its coils, a jacket secured to said rib, an oil-supply pipe coiled around the cylinder between the coils of the rib, a vaporizing-chamber into which said coiled pipe discharges, a mixing-chamber communicating with said vaporizing-chamber and having communication with the interior of the cylinder, and a valve for controlling said communication, substantially as specified.

2. In hydrocarbon-oil engines, a cylinder, a rib extending spirally around said cylinder and having openings through its coils, a jacket secured to said rib, an oil-supply pipe coiled around the cylinder between the coils of the rib, a vaporizing-chamber, a spray-nozzle for receiving oil from the oil-pipe and discharging into said chamber, screens in said chamber below said nozzle, a cup surrounding the chamber and adapted to receive oil from the oil-pipe, a mixing-chamber at one side of the cylinder, a pipe leading from the vaporizing-chamber into said mixing-chamber, a valve for controlling the communication between said pipe and the mixing-chamber, a port in the wall of the cylinder communicating with said mixing-chamber, a valve for controlling said communication, and a screen in the opening which provides communication between said mixing-chamber and the port, substantially as specified.

3. In a hydrocarbon-oil engine, a cylinder, a rib extended spirally around the upper portion of said cylinder and provided with openings, an oil-supply pipe coiled around the cylinder between the coils of the rib, a supplemental heating-chamber on the cylinder and communicating with said oil-pipe, a cup on the cylinder within said supplemental chamber, a vaporizing-chamber in said cup, an oil-pipe coiled around the vaporizing-chamber and communicating with the supplemental chamber, a nozzle leading from said pipe into the vaporizing-chamber, a mixing-chamber having communication with the interior of the cylinder, and a pipe leading from the vaporizing-chamber into said mixing-chamber, substantially as specified.

4. A hydrocarbon-oil engine comprising a cylinder, a rib extended spirally around the upper portion of the cylinder and having openings, an oil-supply pipe extended spirally around the cylinder, a jacket secured to the rib, a vaporizing-chamber on the cylinder and receiving oil from the oil-pipe, a casing on the cylinder having an opening for the inlet of air, a gas and air mixing chamber in a wall of the cylinder and having communication with the interior of the cylinder, means for controlling said communication, and a pipe leading from the vaporizing-chamber into said mixing-chamber, substantially as specified.

In testimony whereof I have signed my name to this specification in the presence of two subscribing witnesses.

DWIGHT ALONZO BRIGGS.

Witnesses:
WM. ROGERS,
V. R. DAVY.